(12) United States Patent
He et al.

(10) Patent No.: US 12,334,838 B2
(45) Date of Patent: Jun. 17, 2025

(54) VOLTAGE DRIVING CIRCUIT AND SYSTEM AND HOUSEHOLD APPLIANCE

(71) Applicant: Gree Green Refrigeration Technology Center Co., Ltd. of Zhuhai, Guangdong (CN)

(72) Inventors: Xiaolin He, Guangdong (CN); Wei Huang, Guangdong (CN); Fan Yang, Guangdong (CN); Wangfa Zhuang, Guangdong (CN)

(73) Assignee: Gree Green Refrigeration Technology Center Co., Ltd. of Zhuhai, Guangdong (CN)

( * ) Notice: Subject to any disclaimer, the term of this patent is extended or adjusted under 35 U.S.C. 154(b) by 0 days.

(21) Appl. No.: 18/682,175

(22) PCT Filed: Aug. 9, 2022

(86) PCT No.: PCT/CN2022/111091
§ 371 (c)(1),
(2) Date: Feb. 8, 2024

(87) PCT Pub. No.: WO2023/061010
PCT Pub. Date: Apr. 20, 2023

(65) Prior Publication Data
US 2025/0132688 A1    Apr. 24, 2025

(30) Foreign Application Priority Data
Oct. 15, 2021 (CN) .......................... 202111204781.2

(51) Int. Cl.
*H02M 5/458*    (2006.01)
*H02M 1/00*     (2007.01)
*H02M 7/5387*   (2007.01)

(52) U.S. Cl.
CPC ......... *H02M 5/458* (2013.01); *H02M 1/0032* (2021.05); *H02M 1/007* (2021.05); *H02M 7/53871* (2013.01)

(58) Field of Classification Search
None
See application file for complete search history.

(56) References Cited

U.S. PATENT DOCUMENTS 2,591,605 A    4/1952    Reed
4,720,668 A    1/1988    Lee et al.
(Continued)

FOREIGN PATENT DOCUMENTS

CN    1996736 A    7/2007
CN    102403920 A  4/2012
(Continued)

OTHER PUBLICATIONS

CN202111204781.2, First Examination Opinion Notification Letter, Dec. 27, 2024.
(Continued)

*Primary Examiner* — Jared Fureman
*Assistant Examiner* — Aqeel H Bukhari
(74) *Attorney, Agent, or Firm* — The Webb Law Firm

(57) ABSTRACT

The present application relates to a voltage driving circuit and system and a household appliance. The voltage driving circuit includes a diode; a thin film capacitor; a resonant circuit configured to be connected to a three-phase power supply and enter a non-resonant operating state in a case where a working current of a load is greater than a present current; a rectifier circuit, of which an input end is connected with the resonant circuit; a switch device, of which a first end is connected with a first output end of the rectifier circuit and an anode of the diode, a second end is connected with a second output end of the rectifier circuit and a first end of (Continued)

the thin film capacitor, wherein a cathode of the diode is connected with a second end of the thin film capacitor; an inverter circuit connected with the first end of the thin film capacitor and the second end of the thin film capacitor, and configured to be connected to the load; and a control device, connected with a control end of the switch device, the resonant circuit, and the inverter circuit.

20 Claims, 2 Drawing Sheets

(56) References Cited

U.S. PATENT DOCUMENTS

| | | | |
|---|---|---|---|
| 5,414,613 | A | 5/1995 | Chen |
| 6,137,701 | A | 10/2000 | Teissier et al. |
| 2002/0181258 | A1 | 12/2002 | Welches |
| 2014/0029318 | A1 | 1/2014 | Chen et al. |
| 2015/0054443 | A1* | 2/2015 | Swamy .................. H02P 23/06 318/504 |
| 2016/0233782 | A1* | 8/2016 | Sakakibara ......... H02M 1/4225 |
| 2017/0016655 | A1* | 1/2017 | Shinomoto ......... H02M 1/4225 |
| 2020/0328671 | A1 | 10/2020 | Li et al. |

FOREIGN PATENT DOCUMENTS

| | | | |
|---|---|---|---|
| CN | 102510215 | A | 6/2012 |
| CN | 103825477 | A | 5/2014 |
| CN | 105553305 | A | 5/2016 |
| CN | 106533224 | A | 3/2017 |
| CN | 206237330 | U | 6/2017 |
| CN | 107959430 | A | 4/2018 |
| CN | 207320841 | U | 5/2018 |
| CN | 207426992 | U | 5/2018 |
| CN | 109075697 | A | 12/2018 |
| CN | 109687709 | A | 4/2019 |
| CN | 109742927 | A | 5/2019 |
| CN | 110768539 | A | 2/2020 |
| CN | 111509964 | A | 8/2020 |
| CN | 113904611 | A | 1/2021 |
| CN | 112865560 | A | 5/2021 |
| CN | 216216619 | U | 4/2022 |
| EP | 3051684 | B1 | 10/2018 |
| JP | H1198847 | A | 4/1999 |
| JP | H11146652 | A | 5/1999 |
| JP | 2000032775 | A | 1/2000 |
| JP | 2001119956 | A | 4/2001 |
| WO | 2019111080 | A1 | 6/2019 |

OTHER PUBLICATIONS

EP 22879957, Extended European Search Report, Dec. 16, 2024.
Liu, Chuan-liang, "A power factor improvement method of three-phase rectifier circuit applying peak current control", Information Technology, 2016, pp. 154-161.

* cited by examiner

VOLTAGE DRIVING CIRCUIT AND SYSTEM AND HOUSEHOLD APPLIANCE

CROSS-REFERENCE TO RELATED APPLICATIONS

This application is the United States national phase of International Patent Application No. PCT/CN2022/111091 filed Aug. 9, 2022, and claims priority to Chinese Patent Application No. 202111204781.2 filed Oct. 15, 2021, the disclosures of which are hereby incorporated by reference in their entireties.

BACKGROUND OF THE INVENTION

Field of the Invention

The present application relates to the field of voltage driving technology, in particular to a voltage driving circuit and system, and a household appliance.

Description of Related Art

With the rapid development of science and technology, increasing categories of electrical appliances are used in daily life, and brings great convenience to daily life. Wherein, the voltage driving circuit of a low-power electrical device (also that is, an electrical device with a power current of less than 16 A, comprising an air-conditioner, a refrigerator, a laundry machine, and the like) generally uses a resonance solution to perform frequency conversion driving during the operation process, thereby ensuring a reliable operation of the low-power electrical device.

BRIEF DESCRIPTION OF THE DRAWINGS

In order to more explicitly explain the technical solutions in the embodiments of the present application or the conventional art, a brief introduction will be given below for the accompanying drawings required to be used in the description of the embodiments or the conventional art. It is obvious that, the accompanying drawings illustrated below are merely some of the embodiments of the present application. For those of ordinary skill in the art, other accompanying drawings may also be obtained according to such accompanying drawings on the premise that no inventive effort is involved.

DETAILED DESCRIPTION

In order to facilitate the understanding of the present application, the present application will be described more comprehensively below with reference to the relevant accompanying drawings. Some embodiments of the present application are given in the accompanying drawings. However, the present application may be implemented in many different forms, which are not limited to the embodiments described herein. On the contrary, these embodiments are provided to make the disclosure of the present application more thorough and comprehensive.

In the related art, in a case where a power current of the voltage driving circuit exceeds a certain level (for example, 16 A) during the operation process, the available voltage of the inverter of the voltage driving circuit will decrease with the increasing partial voltage of the internal electric reactor thereof, which makes the operation of the inverter unstable.

On such basis, it is necessary to provide a voltage driving circuit and system, and a household appliance to solve the problem that a conventional voltage driving circuit is prone to unstable operation of the inverter.

Figure 1:
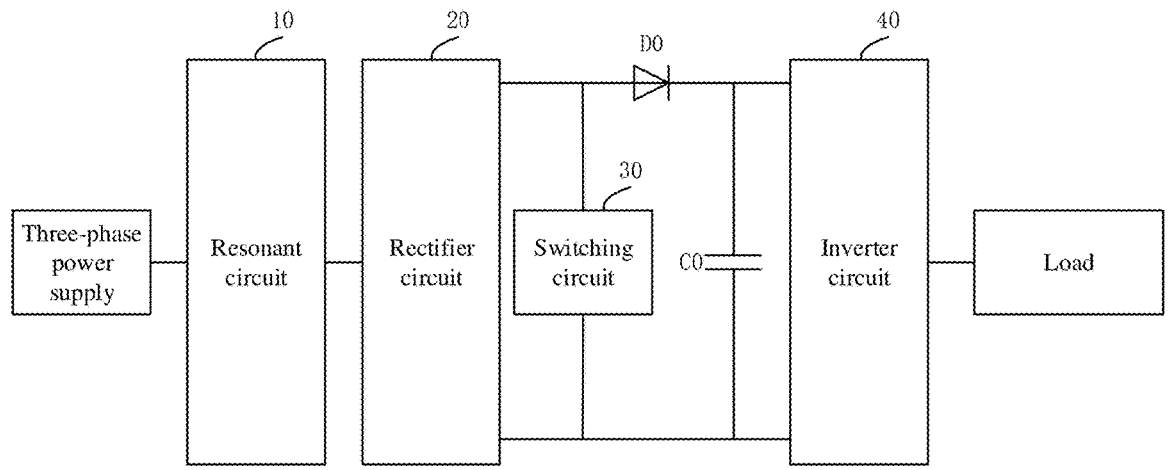
FIG. 1 is a schematic structural view of a voltage driving circuit in some embodiments.

Referring to FIG. 1, a voltage driving circuit comprises a diode D0; a thin film capacitor C0; a resonant circuit 10 configured to be connected to a three-phase power supply, and enter a non-resonant operation state in a case where a working current of a load is greater than a preset current; a rectifier circuit 20, of which an input end is connected with the resonant circuit 10; a switching device 30, of which a first end is connected with a first output end of the rectifier circuit 20 and an anode of the diode, and a second end is connected with a second out end of the rectifier circuit 20 and a first end of the thin film capacitor C0, wherein a cathode of the diode is connected with a second end of the thin film capacitor C0; an inverter circuit 40, connected with the first end of the thin film capacitor C0 and the second end of the thin film capacitor C0, and the inverter circuit 40 is also configured to be connected to a load; and a control device (not shown), connected with a control terminal of the switching device 30, the resonant circuit 10 and the inverter circuit 40, and the control device is configured to transmit a pulse width modulation signal to the switching device 30 in a case where a working current of a load is greater than a preset current.

In some embodiments, the film capacitor C0 is a capacitor by overlapping a metal foil as an electrode with a plastic film such as polyethylene, polypropylene, polystyrene or polycarbonate from both ends and winding the same into a cylindrical configuration. According to the type of a plastic film, it is also referred to as a Mylar capacitor, a polypropylene capacitor (also referred to as a PP capacitor), a polystyrene capacitor (also referred to as a PS capacitor) and a polycarbonate capacitor. It possesses the advantages of non-polarity, a high insulation impedance, an excellent frequency characteristic (a wide frequency response) and a small dielectric loss.

For a passive one-port network comprising a capacitor, and an inductor (an electric reactor) and a resistance element, its port might be capacitive, inductive and resistive. In a case where the voltage and current of a circuit port are in the same phase and the circuit is resistive, it is referred to as a resonance phenomenon. Such circuit is referred to as a resonant circuit 10. Resonance substantively means that the electric field energy in the capacitor and the magnetic field energy in the inductor converted with each other, and completely compensated with each other in negative correlation. The sum of the electric field energy and the magnetic field energy remains constant at all times, and the power supply does not have to convert energy reciprocally with the capacitor or inductor, but only needs to supply electric energy consumed by a resistor in the circuit.

According to the technical solution of the application, in a case where the working current of the load connected to the inverter circuit 40 is less than the preset current, the input voltage of the inverter circuit 40 may meet the operation requirements by resonance of the resonant circuit 10 at this time. Therefore, in a case where the control device detects that the working current of the load is less than the preset current, it is only necessary to control the resonant circuit 10 to be in a capacitor-connected operation state, also that is, in a resonant operation state, so that an input voltage of the inverter is effectively raised by a resonant effect of the resonant circuit 10.

However, in a case where the working current of the load connected to the inverter circuit 40 is greater than the preset current, a partial voltage of the electric reactor in the resonant circuit 10 will be increased, which eventually leads to a reduced input voltage of the inverter circuit 40, and affects the operation reliability of the inverter circuit 40. At this time, the control device will send a corresponding control instruction to the resonant circuit 10, so that the resonant circuit 10 enters a non-capacitor-connected operation state, also that is, the capacitor in the resonant circuit 10 is disconnected from the electric reactor of the resonant circuit 10, so that the resonant circuit 10 ceases a resonant operation and enters a non-resonant operation state. At the same time, the control device will also send a pulse width modulation signal to the switching device 30. Under the effect of a modulated PWM wave, the switching device 30 is turned on and off sequentially, so that redundant energy at the resonant circuit 10 is sent to both ends of the thin film capacitor C0. Moreover, the film capacitor itself does not possess an energy storage function. During energy transmission, the voltage at both ends of the film capacitor C0 will be elevated, thereby boosting the input voltage of the inverter circuit 40 to ensure the operation reliability of the inverter circuit 40.

It may be understood that, the magnitude of the preset current is not unique, and in some detailed embodiments, the preset current is set to be 16 A. In other embodiments, the preset current is also set to be in other magnitudes in conjunction with actual conditions of a unit where the load is located, and it suffices as long as a partial voltage of the resonant circuit 10 will be increased to affect the normal operation of the inverter circuit 40 in a case where the working current of the load is greater than the preset current.

The specific type of the resonant circuit 10 is not unique, and it suffices as long as it is a resonant circuit 10 of such a type that adjusts an on-off state of the capacitor of the resonant with the electric reactor according to a relationship between a working current of the load and the preset current. For example, referring to FIG. 2, in some embodiments, the resonant circuit 10 comprises a first electric reactor L1, a second electric reactor L2, a third electric reactor L3, a first capacitor C1, a second capacitor C2, a third capacitor C3, a first switch K1, a second switch K2 and a third switch K3. A first end of the first electric reactor L1 is connected with a first phase line of the three-phase power supply, a first end of the second electric reactor L2 is connected with a second phase line of the three-phase power supply, a first end of the third electric reactor L3 is connected with a third phase line of the three-phase power supply, a second end of the first electric reactor L1 is connected with a first end of the third switch K3, a second end of the third switch K3 is connected with a first end of the third capacitor C3, a second end of the third capacitor C3 is connected with the first end of the first capacitor C1 and a first input end of the rectifier circuit 20, the first end of the first capacitor C1 is connected with a second end of the second electric reactor L2, a second end of the first capacitor C1 is connected with a first end of the first switch K1, a second end of the first switch K1 is connected with a second end of the third electric reactor L3 and a first end of the second switch K2, the first end of the second switch K2 is connected with a second input end of the rectifier circuit 20, a second end of the second switch K2 is connected with a first end of the second capacitor C2, a second end of the second capacitor C2 is connected with the first end of the third switch K3 and a third input end of the rectifier circuit 20, and the control terminals of the first switch K1, the second switch K2 and the third switch K3 each are connected with the control device (not shown).

In the solution of those embodiments, the first end of each electric reactor is connected to the three-phase power supply respectively, a capacitor and a switch are connected between any two electric reactors, and the control device realizes the connection and disconnection of the capacitor by controlling the on-and-off of the switch. In a case where a unit where the load is located works in a working current lower than a preset current, the first switch K1, the second switch K2 and the third switch K3 are all turned on, and the switching device 30 is in an off state at this time, so that it is unnecessary to input a pulse width modulation signal. In this state, the voltage driving circuit is composed of electric reactors L1-L3, capacitors C1-C3, the rectifier circuit 20 and the inverter circuit 40. An input voltage of the inverter (also that is, a voltage at a location a as shown) is effectively raised by resonance generated by L1-L3 and C1-C3, also that is, the voltage driving circuit is in a normal driving operation state at this time.

It may be understood that, the specific type of the first switch K1, the second switch K2 and the third switch K3 is not unique, and it suffices as long as it is a device with a switching function. For example, in some embodiments, each of the first switch K1, the second switch K2 and the third switch K3 is any of a relay switch, a transistor, a field effect transistor or an insulated gate bipolar transistor.

In some embodiments, the relay switch is a relay, which is an electrical control device and an electrical appliance that makes a predetermined step change of a controlled variable in the electrical output circuit when a change of an input quantity (an excitation quantity) meets specified requirements. The transistor, that is, a triode, and also referred to as a bipolar transistor and crystal triode, is a semiconductor device to control a current, with the function of amplifying a weak signal into an electrical signal with a large amplitude value, and also serves as a contactless switch. The field effect tube, also that is a field effect transistor (FET), mainly has two types: a junction FET-JFET and a metal-oxide semiconductor FET (MOS-FET). The insulated gate bipolar transistor (IGBT) is a voltage-driven power semiconductor device of a compound full-control type composed of BJT (bipolar triode) and MOS (insulated gate field effect transistor), which incorporates the advantages of a high input impedance of MOSFET and a low conduction voltage drop of GTR. The above-described switching devices may all serve as a controller to control whether the capacitor is connected to the resonant circuit 10. In actual operation process, different alternatives are specifically available according to the scenarios.

It may be understood that, in some embodiments, the same type of the first switch K1, the second switch K2 and the third switch K3 is selected, also that is, they are all relay switches, transistors, field effect transistors, or insulated gate bipolar transistor. In other embodiments, different types of devices are also selected for the first switch K1, the second switch K2 and the third switch K3. For example, the first switch K1 is selected to be a relay switch, and the second switch K2 and the third switch K3 are selected to be transistors.

It is to be noted that, the specific type of the rectifier circuit 20 is not unique, and it suffices as long as it is a circuit that can convert AC power into DC power for stable transmission. For example, in some embodiments, the rectifier circuit 20 is a non-controllable rectifier circuit 20.

In some embodiments, the non-controlled rectifier circuit 20 is a rectifier circuit 20 composed of a rectifier diode absent with a control function. In a case where the input AC voltage is constant, the DC voltage obtained on the load is a non-adjustable voltage. The non-controlled rectifier circuit 20 converts applied AC voltage into DC voltage by using the unidirectional conductivity of the rectifier diode. In a desirable circumstance, that is, the rectifier diode has neither inertia nor loss, since it only takes several microseconds to turn the diode on and off, for half a period of 50 Hz current, it may be considered as instantaneously completed. In those embodiments, the non-controllable rectifier circuit 20 is used in the voltage driving circuit, and for a certain circuit structure, the ratio of the DC rectified voltage thereof to the AC power supply voltage is constant, so that it has a favorable operation reliability.

In some embodiments, the rectifier circuit 20 comprises a first diode D1, a second diode D2, a third diode D3, a fourth diode D4, a fifth diode D5 and a sixth diode D6. An anode of the first diode D1 is connected with the resonance circuit 10 and a cathode of the fourth diode D4, a cathode of the third diode D3 is connected with a cathode of the first diode D1 and a cathode of the fifth diode D5, the cathode of the fifth diode D5 is connected with a first end of the switching device 30 and the anode of the diode, an anode of the third diode D3 is connected with the resonance circuit 10 and a cathode of the sixth diode D6, an anode of the sixth diode D6 is connected with an anode of the fourth diode D4 and an anode of the second diode D2, the anode of the second diode D2 is connected with the second end of the switching device 30, and an anode of the fifth diode D5 is connected with the resonant circuit 10 and a cathode of the second diode D2.

In some embodiments, under the structure of the rectifier circuit 20, in a case where the unit where the load is located works at a working current lower than a preset current, the first switch K1, the second switch K2 and the third switch K3 are all turned on, and the switching device 30 is in an off state at this time, so that it is unnecessary to input a pulse width modulation signal. In this state, the voltage driving circuit is composed of electric reactors L1-L3, capacitors C1-C3, the rectifier circuit 20 and the inverter circuit 40, and an input voltage of the inverter is effectively raised by resonance generated by L1-L3 and C1-C3.

Figure 3:
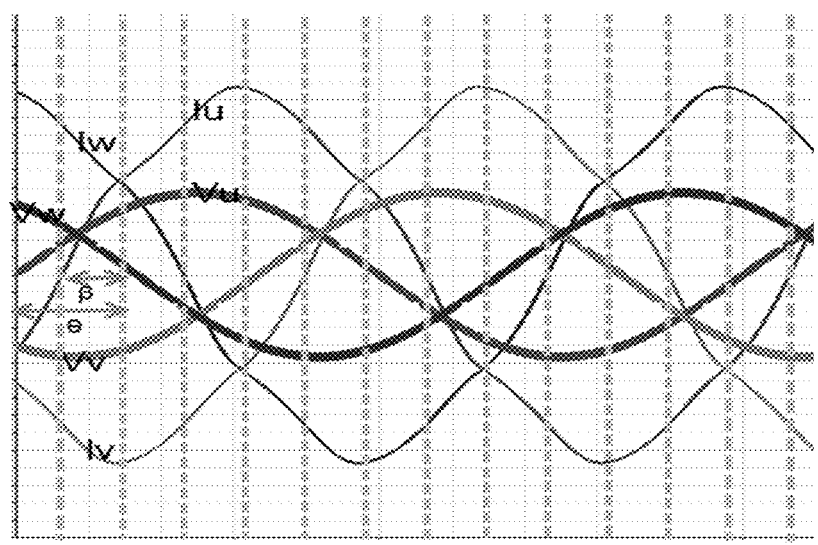
FIG. 3 is a schematic view of a three-phase voltage and current waveform output by a resonant circuit in some embodiments.

The specific operation method is as follows: referring to FIG. 3, in a case where the circuit works under rated conditions (a heavy load), assume a current lagging voltage $0\theta$ angle (the leading condition is similar to the lagging condition) and a cutoff angle $\beta$ of less than $\pi/3$ (60 degrees), repeated once each ⅙ cycle. The capacitors C1-C3 start charging or discharging for a $\beta$ angle at a zero-crossing moment of each phase current, and the conduction angle of each diode in the rectifier circuit 20 is $\pi-\beta$. In a case where $\omega t$ is in the range of from $\theta-\beta$ to $\theta$, D5 and D6 are turned on, and C2 and C3 are charged, with a load voltage at both ends of C1; in a case where $\omega t$ is in the range of from $\theta$ to $\theta-\beta+\pi/3$, D1, D5 and D6 are conductive. Since the thin film capacitor C0 is absent with an energy storage function, by way of the above-described steps, the raised DC pulse voltage of the inverter is used by the inverter reliably.

Figure 2:
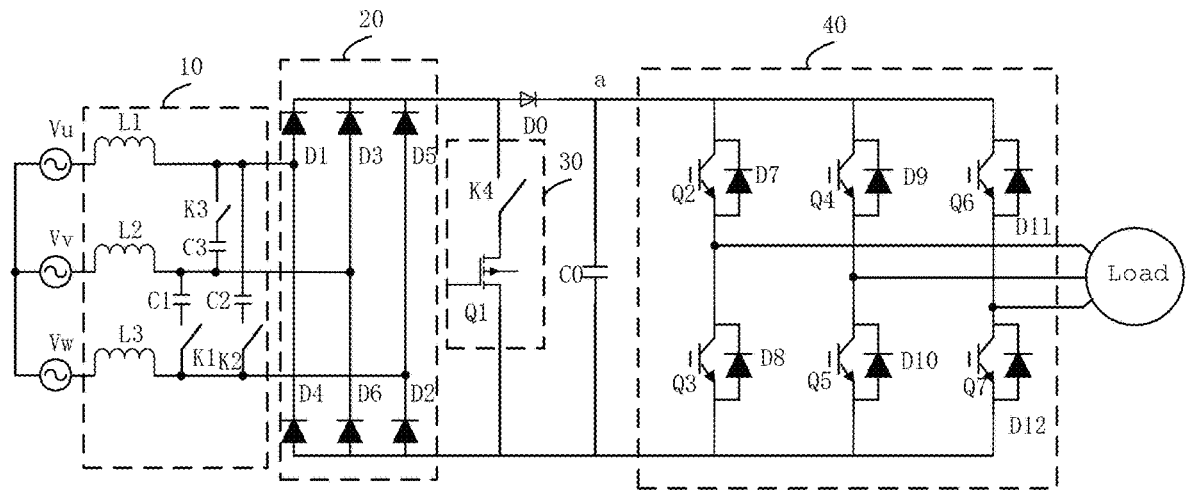
FIG. 2 is a schematic structural view of a voltage driving circuit in other embodiments.

Referring to FIG. 2, in some embodiments, the switching device 30 comprises a fourth switch K4 and a first switching device Q1. A first end of the fourth switch K4 is connected with the first output end of the rectifier circuit 20 and the anode of the diode, a second end of the fourth switch K4 is connected with the first end of a first switching device Q1, a second end of the first switching device Q1 is connected with the second output end of the rectifier circuit 20 and the first end of the thin film capacitor C0, a control terminal of the fourth switch K4 and a control terminal of the first switching device Q1 are connected with the control device (not shown), and the control terminal of the first switching device Q1 is configured to input a pulse width modulation signal.

In some embodiments, the switching device 30 specifically comprises two switching devices, wherein the fourth switch K4 serves as a control device for whether the diode, the thin film capacitor C0 and the first switching device Q1 are connected to the circuit. In a case where the working current of the load is greater than the preset current, the control device first controls the fourth switch K4 to be turned on. The control device has the function of generating a PWM pulse, and the control device will input a modulated PWM wave to the first switching device Q1 only after the fourth switch K4 is turned on, so as to raise a voltage at both ends of the thin film capacitor C0. In those embodiments, two switching devices, which are used as a switching device 30 to realize an operation of switching an operation state of the voltage driving circuit, has the advantage of a favorable control reliability.

Referring to FIG. 2, in some embodiments, the inverter circuit 40 comprises a second switching device Q2, a third switching device Q3, a fourth switching device Q4, a fifth switching device Q5, a sixth switching device Q6, a seventh switching device Q7, a seventh diode D7, an eighth diode D8, a ninth diode D9, a tenth diode D10, an eleventh diode D11 and a twelfth diode D12. The control terminals of the second switching device Q2, the third switching device Q3, the fourth switching device Q4, the fifth switching device Q5, the sixth switching device Q6 and the seventh switching device Q7 each are connected with the control device respectively (not shown), a first end of the second switching device Q2 is connected with a cathode of the seventh diode D7 and the second end of the thin film capacitor C0, a second end of the second switching device Q2 is connected with an anode of the seventh diode D7 and a first end of the third switching device Q3, the first end of the third switching device Q3 is connected with a cathode of the eighth diode D8 and the load, a second end of the third switching device Q3 is connected with an anode of the eighth diode D8 and the first end of the thin film capacitor C0, a first end of the fourth switching device Q4 is connected with a cathode of the ninth diode D9 and the first end of the second switching device Q2, a second end of the fourth switching device Q4 is connected with an anode of the ninth diode D9 and a first end of the fifth switching device Q5, the first end of the fifth switching device Q5 is connected with a cathode of the tenth diode D10 and the load, a second end of the fifth switching device Q5 is connected with an anode of the tenth diode D10 and the second end of the third switching device Q3, a first end of the sixth switching device Q6 is connected with a cathode of the eleventh diode D11 and the first end of the fourth switching device Q4, a second end of the sixth switching device Q6 is connected with an anode of the eleventh diode D11 and a first end of the seventh switching device Q7, the first end of the seventh switching device Q7 is connected with a cathode of the twelfth diode D12 and the load, and a second end of the seventh switching device Q7 is connected with an anode of the twelfth diode D12 and the second end of the fifth switching device Q5.

In some embodiments, the type of inverter circuit 40 is not unique, and it suffices as long as DC power supply can be converted into AC power supply for supplying power to an AC load. In those embodiments, a three-phase bridge inverter circuit 40 is specifically used to convert the DC power flowing out from the rectifier circuit 20 so as to supply power to various AC loads.

It is to be noted that, the specific types of the first switching device Q1 in the switching device and each switching device in the inverter circuit 40 are not unique. In some embodiments, the first switching device Q1 is a metal-oxide semiconductor field effect transistor, and the second switching device Q2, the third switching device Q3, the fourth switching device Q4, the fifth switching device Q5, the sixth switching device Q6 and the seventh switching device Q7 are transistors.

In the above-described voltage driving circuit, the thin film capacitor C0, the switching device 30 and the diode are provided between the rectifier circuit 20 and the inverter circuit 40. In a case where the working current of the load connected to the inverter circuit 40 exceeds the preset current, the resonant circuit 10 can enter a non-resonant operation state, and the control device will also input a pulse width modulation signal to the switching device 30 at the same time. In this state, a capacitor is not connected to the resonant circuit 10, and the inductance in the resonant circuit 10 will store energy at this time. Under the effect of the input pulse width modulation signal, the switching device 30 will be turned on and off sequentially, so that redundant energy stored in the resonant circuit 10 is transmitted to both ends of the thin film capacitor C0. Moreover, since the thin film capacitor C0 does not have an energy storage function, the voltage at both ends of the thin film capacitor C0 is raised under the effect of energy transmitted to both ends of the thin film capacitor C0. By way of this solution, in a case where the working current of the load exceeds the preset current causing a partial voltage of the resonant circuit 10 to increase, the voltage at both ends of the thin film capacitor C0 will be increased by turning the switching device 30 on and off sequentially, thereby raising the available voltage of the inverter, ensuring the stable operation of the inverter, and reducing the possibility of the occurrence that the bus voltage is so low that the normal operation of the load is affected.

A voltage drive system comprises a three-phase resistive/inductive load and the above-described voltage driving circuit.

In some embodiments, for the voltage driving circuit as shown in the above-described embodiments and the accompanying drawings, the three-phase resistive/inductive load is a resistive load or an inductive load using a three-phase alternating current as a power supply. The resistive load means that the load is resistive when there is no phase difference between the load current and the load voltage as compared with the power supply, for example, the load is an incandescent lamp, an electric furnace, or the like. The inductive load refers to a load with inductance parameters, also that is, a load with a characteristic of a load current lagging a load voltage by a phase difference is an inductive load, for example, a transformer and an electric motor.

In a case where the working current of the load connected to the inverter circuit 40 is less than the preset current, an input voltage of the inverter circuit 40 may meet the operation requirements by resonance of the resonant circuit 10. Therefore, in a case where the control device detects that the working current of the load is less than the preset current, it is only necessary to control the resonant circuit 10 to be in a capacitor-connected operation state, also that is, in a resonant operation state, so that an input voltage of the inverter will be effectively raised by a resonant effect of the resonant circuit 10.

However, in a case where the working current of the load connected to the inverter circuit 40 is greater than the preset current, the partial voltage of the electric reactor in the resonant circuit 10 will be increased, which eventually leads to a reduced input voltage of the inverter circuit 40, and affects the operation reliability of the inverter circuit 40. At this time, the control device will send a corresponding control instruction to the resonant circuit 10, so that the resonant circuit 10 enters a non-capacitor-connected operation state, also that is, the capacitor in the resonant circuit 10 will be cut out of the circuit, so that the resonant circuit 10 ceases a resonant operation and enters a non-resonant operation state. At the same time, the control device will also send a pulse width modulation signal to the switching device 30. Under the effect of a modulated PWM wave, the switching device 30 is turned on and off sequentially, so that redundant energy at the resonant circuit 10 is sent to both ends of the thin film capacitor C0. Moreover, the film capacitor itself does not possess an energy storage function. During energy transmission, the voltage at both ends of the film capacitor C0 will be elevated, thereby boosting the input voltage of the inverter circuit 40 to ensure the operation reliability of the inverter circuit 40.

In the above-described voltage driving system, for the voltage driving circuit, a thin film capacitor C0, a switching device 30 and a diode are provided between the rectifier circuit 20 and the inverter circuit 40. In a case where the working current of the load connected to the inverter circuit 40 exceeds the preset current, the resonant circuit 10 can enter a non-resonant operation state, and the control device will also input a pulse width modulation signal to the switching device 30 at the same time. In this state, a capacitor is not connected to the resonant circuit 10, and the resonant circuit 10 will store energy at this time. Under the effect of the input pulse width modulation signal, the switching device 30 will be turned on and off sequentially, so that redundant energy stored in the resonant circuit 10 is transmitted to both ends of the thin film capacitor C0. Moreover, since the thin film capacitor C0 does not have an energy storage function, the voltage at both ends of the thin film capacitor C0 is raised under the effect of energy transmitted to both ends of the thin film capacitor C0. By way of this solution, in a case where the working current of the load exceeds the preset current causing a partial voltage of the resonant circuit 10 to increase, the voltage at both ends of the thin film capacitor C0 will be increased by turning the switching device 30 on and off sequentially, thereby raising an available voltage of the inverter, ensuring a stable operation of the inverter, and reducing the possibility of the occurrence that the bus voltage is so low that the normal operation of the three-phase resistive/inductive load is affected.

A household appliance comprises the above-described voltage driving system.

In some embodiments, for the voltage driving system as shown in the above-described embodiments and the accompanying drawings, in a case where the working current of the load connected to the inverter circuit 40 is less than the preset current, an input voltage of the inverter circuit 40 may meet the operation requirements by resonance of the resonant circuit 10. Therefore, in a case where the control device detects that the working current of the load is less than the preset current, it is only necessary to control the resonant circuit 10 to be in a capacitor-connected operation state, also that is, in a resonant operation state, so that an input voltage of the inverter is effectively raised by a resonant effect of the resonant circuit 10.

However, in a case where the working current of the load connected to the inverter circuit 40 is greater than the preset current, the partial voltage of the electric reactor in the resonant circuit 10 will be increased, which eventually leads to a reduced input voltage of the inverter circuit 40, and affects the operation reliability of the inverter circuit 40. At this time, the control device will send a corresponding control instruction to the resonant circuit 10, so that the resonant circuit 10 enters a non-capacitor-connected operation state, also that is, the capacitor in the resonant circuit 10 will be cut out of the circuit, so that the resonant circuit 10 ceases a resonant operation. At the same time, the control device will also send a pulse width modulation signal to the switching device 30. Under the effect of a modulated PWM wave, the switching device 30 is turned on and off sequentially, so that redundant energy at the resonant circuit 10 is sent to both ends of the thin film capacitor C0. Moreover, the film capacitor itself does not possess an energy storage function. During energy transmission, the voltage at both ends of the film capacitor C0 will be elevated, thereby boosting the input voltage of the inverter circuit 40 to ensure the operation reliability of the inverter circuit 40.

It may be understood that, the specific type of a household appliance is not unique, and it suffices as long as it is a household appliance of a three-phase resistive/inductive load type. For example, in some embodiments, it is specifically an air-conditioner, a refrigerator, a laundry machine, and the like.

In the above-described household appliance, the thin film capacitor C0, the switching device 30 and the diode are provided between the rectifier circuit 20 and the inverter circuit 40. In a case where the working current of the load connected to the inverter circuit 40 exceeds the preset current, the resonant circuit 10 can enter a non-resonant operation state, and the control device will also input a pulse width modulation signal to the switching device 30 at the same time. In this state, a capacitor is not connected to the resonant circuit 10, and the inductance in the resonant circuit 10 will store energy at this time. Under the effect of the input pulse width modulation signal, the switching device 30 will be turned on and off sequentially, so that redundant energy stored in the resonant circuit 10 is transmitted to both ends of the thin film capacitor C0. Moreover, since the thin film capacitor C0 does not have an energy storage function, the voltage at both ends of the thin film capacitor C0 is raised under the effect of energy transmitted to both ends of the thin film capacitor C0. By way of this solution, in a case where the working current of the load exceeds the preset current causing the partial voltage of the resonant circuit 10 to increase, the voltages at both ends of the thin film capacitor C0 are increased by turning the switching device 30 on and off sequentially, thereby raising an available voltage of the inverter, ensuring a stable operation of the inverter, and reducing the possibility of the occurrence that the bus voltage is so low that the normal operation of the household appliance is affected.

Various technical features of the above-described embodiments may be combined arbitrarily. In order to make a concise description, not all possible combinations of various technical features in the above-described embodiments are described. However, as long as the combinations of these technical features are not contradictory, they shall be considered as the scope recited in this specification.

The above-described embodiments only express several implementations of the present application, with specific and detailed descriptions thereof, but cannot be thus understood as limiting the scope of the patent application. It is to be noted that, for those of ordinary skill in the art, without departing from the concept of the present application, several modifications and improvements may also be made, which all pertain to the protection scope of the present application. Therefore, the protection scope of the present patent application shall be subject to the appended claims.

What is claimed is:

1. A voltage driving circuit comprising:
   a diode;
   a thin film capacitor;
   a resonant circuit configured to be connected to a three-phase power supply and enter a non-resonant operation state in a case where a working current of a load is greater than a preset current;
   a rectifier circuit, of which an input end is connected with the resonant circuit;
   a switching device, of which a first end is connected with a first output end of the rectifier circuit and an anode of the diode, and a second end is connected with a second output end of the rectifier circuit and a first end of the thin film capacitor, wherein a cathode of the diode is connected with a second end of the thin film capacitor;
   an inverter circuit connected with the first end of the thin film capacitor and the second end of the thin film capacitor, and configured to be connected to the load; and
   a control device, connected with a control terminal of the switching device, the resonant circuit and the inverter circuit, and configured to transmit a pulse width modulation signal to the switching device in a case where the working current of the load is greater than the preset current.

2. The voltage driving circuit according to claim 1, wherein:
   the resonant circuit comprises a first electric reactor, a second electric reactor, a third electric reactor, a first capacitor, a second capacitor, a third capacitor, a first switch, a second switch and a third switch; and
   a first end of the first electric reactor is connected with a first phase line of the three-phase power supply, a first end of the second electric reactor is connected with a second phase line of the three-phase power supply, a first end of the third electric reactor is connected with a third phase line of the three-phase power supply, a second end of the first electric reactor is connected with a first end of the third switch, a second end of the third switch is connected with a first end of the third capacitor, a second end of the third capacitor is connected with a first end of the first capacitor and a first input end of the rectifier circuit, the first end of the first capacitor is connected with a second end of the second electric reactor, a second end of the first capacitor is connected with a first end of the first switch, a second end of the first switch is connected with a second end of the third electric reactor and a first end of the second switch, the first end of the second switch is connected with a second input end of the rectifier circuit, a second end of the second switch is connected with a first end of the second capacitor, a second end of the second capacitor is connected with the first end of the third switch and a third input end of the rectifier circuit, and the control terminals of the first switch, the second switch and the third switch each are connected with the control device.

3. The voltage driving circuit according to claim 2, wherein each of the first switch, the second switch and the third switch is any of a relay switch, a transistor, a field effect transistor or an insulated gate bipolar transistor.

4. The voltage driving circuit according to claim 1, wherein the rectifier circuit is a non-controllable rectifier circuit.

5. The voltage driving circuit according to claim 4, wherein:
the rectifier circuit comprises a first diode, a second diode, a third diode, a fourth diode, a fifth diode and a sixth diode; and
an anode of the first diode is connected with the resonance circuit and a cathode of the fourth diode, a cathode of the third diode is connected with a cathode of the first diode and a cathode of the fifth diode, the cathode of the fifth diode is connected with a first end of the switching device and the anode of the diode, and an anode of the third diode is connected with the resonance circuit and a cathode of the sixth diode, an anode of the sixth diode is connected with an anode of the fourth diode and an anode of the second diode, the anode of the second diode is connected with the second end of the switching device, and an anode of the fifth diode is connected with the resonant circuit and a cathode of the second diode.

6. The voltage driving circuit according to claim 1, wherein the switching device comprises a fourth switch and a first switching device, wherein a first end of the fourth switch is connected with the first output end of the rectifier circuit and the anode of the diode, a second end of the fourth switch is connected with a first end of the first switching device, a second end of the first switching device is connected with the second output end of the rectifier circuit and the first end of the thin film capacitor, a control terminal of the fourth switch and a control terminal of the first switching device each are connected with the control device, and the control terminal of the first switching device is configured to input the pulse width modulation signal.

7. The voltage driving circuit according to claim 6, wherein:
the inverter circuit comprises a second switching device, a third switching device, a fourth switching device, a fifth switching device, a sixth switching device, a seventh switching device, a seventh diode, an eighth diode, a ninth diode, a tenth diode, an eleventh diode and a twelfth diode; and
control terminals of the second switching device, the third switching device, the fourth switching device, the fifth switching device, the sixth switching device and the seventh switching device each are connected with the control device, a first end of the second switching device is connected with a cathode of the seventh diode and the second end of the thin film capacitor, a second end of the second switching device is connected with an anode of the seventh diode and a first end of the third switching device, the first end of the third switching device is connected with a cathode of the eighth diode and the load, a second end of the third switching device is connected with an anode of the eighth diode and the first end of the thin film capacitor, a first end of the fourth switching device is connected with a cathode of the ninth diode and the first end of the second switching device, a second end of the fourth switching device is connected with an anode of the ninth diode and a first end of the fifth switching device, the first end of the fifth switching device is connected with a cathode of the tenth diode and the load, a second end of the fifth switching device is connected with an anode of the tenth diode and the second end of the third switching device, a first end of the sixth switching device is connected with a cathode of the eleventh diode and the first end of the fourth switching device, a second end of the sixth switching device is connected with an anode of the eleventh diode and a first end of the seventh switching device, the first end of the seventh switching device is connected with a cathode of the twelfth diode and the load, and a second end of the seventh switching device is connected with an anode of the twelfth diode and the second end of the fifth switching device.

8. The voltage driving circuit according to claim 7, wherein the first switching device is a metal-oxide semiconductor field effect transistor, and the second switching device, the third switching device, the fourth switching device, the fifth switching device, the sixth switching device and the seventh switching device are transistors.

9. The voltage driving circuit according to claim 2, wherein the first switch, the second switch and the third switch are of a same type comprising a relay switch, a transistor, a field effect transistor or an insulated gate bipolar transistor.

10. The voltage driving circuit according to claim 2, wherein at least two of the first switch, the second switch and the third switch are of different types comprising a relay switch, a transistor, a field effect transistor or an insulated gate bipolar transistor.

11. The voltage driving circuit according to claim 1, wherein the film capacitor is any of a Mylar capacitor, a polypropylene capacitor, a polystyrene capacitor and a polycarbonate capacitor.

12. The voltage driving circuit according to claim 1, wherein the inverter circuit is a three-phase bridge inverter circuit.

13. A voltage drive system comprising a three-phase resistive/inductive load and the voltage driving circuit according to claim 1.

14. A household appliance comprising the voltage driving system according to claim 13.

15. The household appliance according to claim 14, wherein the household appliance is at least one of an air conditioner, a refrigerator or a laundry machine.

16. The voltage driving circuit according to claim 2, wherein the rectifier circuit is a non-controllable rectifier circuit.

17. The voltage driving circuit according to claim 16, wherein:
the rectifier circuit comprises a first diode, a second diode, a third diode, a fourth diode, a fifth diode and a sixth diode; and
an anode of the first diode is connected with the resonance circuit and a cathode of the fourth diode, a cathode of the third diode is connected with a cathode of the first diode and a cathode of the fifth diode, the cathode of the fifth diode is connected with a first end of the switching device and the anode of the diode, and an anode of the third diode is connected with the resonance circuit and a cathode of the sixth diode, an anode of the sixth diode is connected with an anode of the fourth diode and an anode of the second diode, the anode of the second diode is connected with the second end of the switching device, and an anode of the fifth diode is connected with the resonant circuit and a cathode of the second diode.

18. The voltage driving circuit according to claim 2, wherein the switching device comprises a fourth switch and a first switching device, wherein a first end of the fourth switch is connected with the first output end of the rectifier circuit and the anode of the diode, a second end of the fourth switch is connected with a first end of the first switching device, a second end of the first switching device is connected with the second output end of the rectifier circuit and the first end of the thin film capacitor, a control terminal of the fourth switch and a control terminal of the first switching device each are connected with the control device, and the control terminal of the first switching device is configured to input the pulse width modulation signal.

19. The voltage driving circuit according to claim 18, wherein:
the inverter circuit comprises a second switching device, a third switching device, a fourth switching device, a fifth switching device, a sixth switching device, a seventh switching device, a seventh diode, an eighth diode, a ninth diode, a tenth diode, an eleventh diode and a twelfth diode; and
control terminals of the second switching device, the third switching device, the fourth switching device, the fifth switching device, the sixth switching device and the seventh switching device each are connected with the control device, a first end of the second switching device is connected with a cathode of the seventh diode and the second end of the thin film capacitor, a second end of the second switching device is connected with an anode of the seventh diode and a first end of the third switching device, the first end of the third switching device is connected with a cathode of the eighth diode and the load, a second end of the third switching device is connected with an anode of the eighth diode and the first end of the thin film capacitor, a first end of the fourth switching device is connected with a cathode of the ninth diode and the first end of the second switching device, a second end of the fourth switching device is connected with an anode of the ninth diode and a first end of the fifth switching device, the first end of the fifth switching device is connected with a cathode of the tenth diode and the load, a second end of the fifth switching device is connected with an anode of the tenth diode and the second end of the third switching device, a first end of the sixth switching device is connected with a cathode of the eleventh diode and the first end of the fourth switching device, a second end of the sixth switching device is connected with an anode of the eleventh diode and a first end of the seventh switching device, the first end of the seventh switching device is connected with a cathode of the twelfth diode and the load, and a second end of the seventh switching device is connected with an anode of the twelfth diode and the second end of the fifth switching device.

20. A voltage drive system comprising a three-phase resistive/inductive load and the voltage driving circuit according to claim 2.

* * * * *

UNITED STATES PATENT AND TRADEMARK OFFICE
CERTIFICATE OF CORRECTION

PATENT NO. : 12,334,838 B2
APPLICATION NO. : 18/682175
DATED : June 17, 2025
INVENTOR(S) : Xiaolin He et al.

Page 1 of 1

It is certified that error appears in the above-identified patent and that said Letters Patent is hereby corrected as shown below:

On the Title Page

Column 2, item (57) Abstract, Line 6, delete "present" and insert -- preset --

Signed and Sealed this
Fifth Day of August, 2025

Coke Morgan Stewart
*Acting Director of the United States Patent and Trademark Office*